US012597996B2

(12) United States Patent
La Fauci et al.

(10) Patent No.: US 12,597,996 B2
(45) Date of Patent: Apr. 7, 2026

(54) PROACTIVE PATH COMPUTATION ELEMENT TO ACCELERATE PATH COMPUTATION

(71) Applicant: Cisco Technology, Inc., San Jose, CA (US)

(72) Inventors: Domenico La Fauci, Monza (IT); Andrea Zanardi, Padua (IT); Lorenzo Galvagni, Nogaredo (IT); Pietro De Matteis, Trento (IT)

(73) Assignee: CISCO TECHNOLOGY, INC., San Jose, CA (US)

( * ) Notice: Subject to any disclaimer, the term of this patent is extended or adjusted under 35 U.S.C. 154(b) by 356 days.

(21) Appl. No.: 18/337,825

(22) Filed: Jun. 20, 2023

(65) Prior Publication Data

US 2024/0430004 A1    Dec. 26, 2024

(51) Int. Cl.
*H04B 10/038* (2013.01)
(52) U.S. Cl.
CPC .................................. *H04B 10/038* (2013.01)
(58) Field of Classification Search
CPC .................................................... H04B 10/038
See application file for complete search history.

(56) References Cited

U.S. PATENT DOCUMENTS

2012/0321297 A1    12/2012   Bottari et al.
2014/0211612 A1     7/2014   Dutti et al.
2014/0219649 A1*    8/2014   Suryaputra .......... H04B 10/038
                                                              398/5
2014/0270749 A1*    9/2014   Miniscalco ............ H04B 10/11
                                                              398/5
2015/0023663 A1*    1/2015   Gerstel ............... H04J 14/0268
                                                              398/49
2018/0191432 A1     7/2018   Frankel et al.
2019/0109638 A1*    4/2019   Yilmaz .............. H04B 10/0791
2020/0028608 A1     1/2020   Bathula et al.
(Continued)

OTHER PUBLICATIONS

Farrel, A., et al., "A Path Computation Element (PCE)-Based Architecture," Network Working Group, Request for Comments: 4655, Informational, https://www.rfc-editor.org/rfc/rfc4655, Aug. 2006, 40 pages.

(Continued)

*Primary Examiner* — Nathan M Cors
(74) *Attorney, Agent, or Firm* — Edell, Shapiro & Finnan, LLC

(57) ABSTRACT

A method performed at a controller of an optical network configured with an optical path comprising a series of fiber spans for forwarding traffic: as a background operation to forwarding the traffic along the optical path, generating and storing precomputed optical paths as alternates to the optical path for path restoration by simulating some number of faults impacting the optical path; upon receiving, from the optical network, a path restoration query that indicates actually failed fiber spans, determining availability of a precomputed optical path that avoids the actually failed fiber spans; and when the precomputed optical path is available, sending, to the optical network, a first descriptor of the precomputed optical path to enable a deployment of the precomputed optical path. The method drastically reduces the time of alternate path research in complex meshed networks.

20 Claims, 5 Drawing Sheets

(56) References Cited

U.S. PATENT DOCUMENTS

| | | | | |
|---|---|---|---|---|
| 2020/0127733 A1 * | 4/2020 | Eira | .................... | H04J 14/0295 |
| 2022/0385357 A1 * | 12/2022 | Chander | ............ | H04J 14/0268 |

OTHER PUBLICATIONS

Xiong, Y., et al., "SDN Enabled Restoration With Triggered Precomputation in Elastic Optical Inter-Datacenter Networks," J. Opt. Commun. NETW./vol. 10, No. 1, 1943-0620/18/010024-11, Optical Society of America, Jan. 2018, 11 pages.
Han, M., "Optimal Routing Path Calculation for SDN Using Genetic Algorithm," International Journal of Hybrid Information Technology, vol. 11, No. 3, Dept. Information and Communications, Mokpo National Univ., Republic of Korea, Feb. 2018, 6 pages.
Vasseur, J, et al., "The Path Computation Element (PCE) for MPLS networks and its application to the Internet of Things (IoT)," Networking and Internet Architecture [cs.NI], https://pastel.archives-ouvertes.fr/tel-01336236, Jun. 2016, 169 pages.
Reddy, M., et al., "Connection Provisioning for PCE-Based GMPLS Optical Networks," CrossMark, Wireless Personal Communications, https://doi.org/10.1007/s11277-018-5962-4, Sep. 2018, 16 pages.

* cited by examiner

Figure 2:
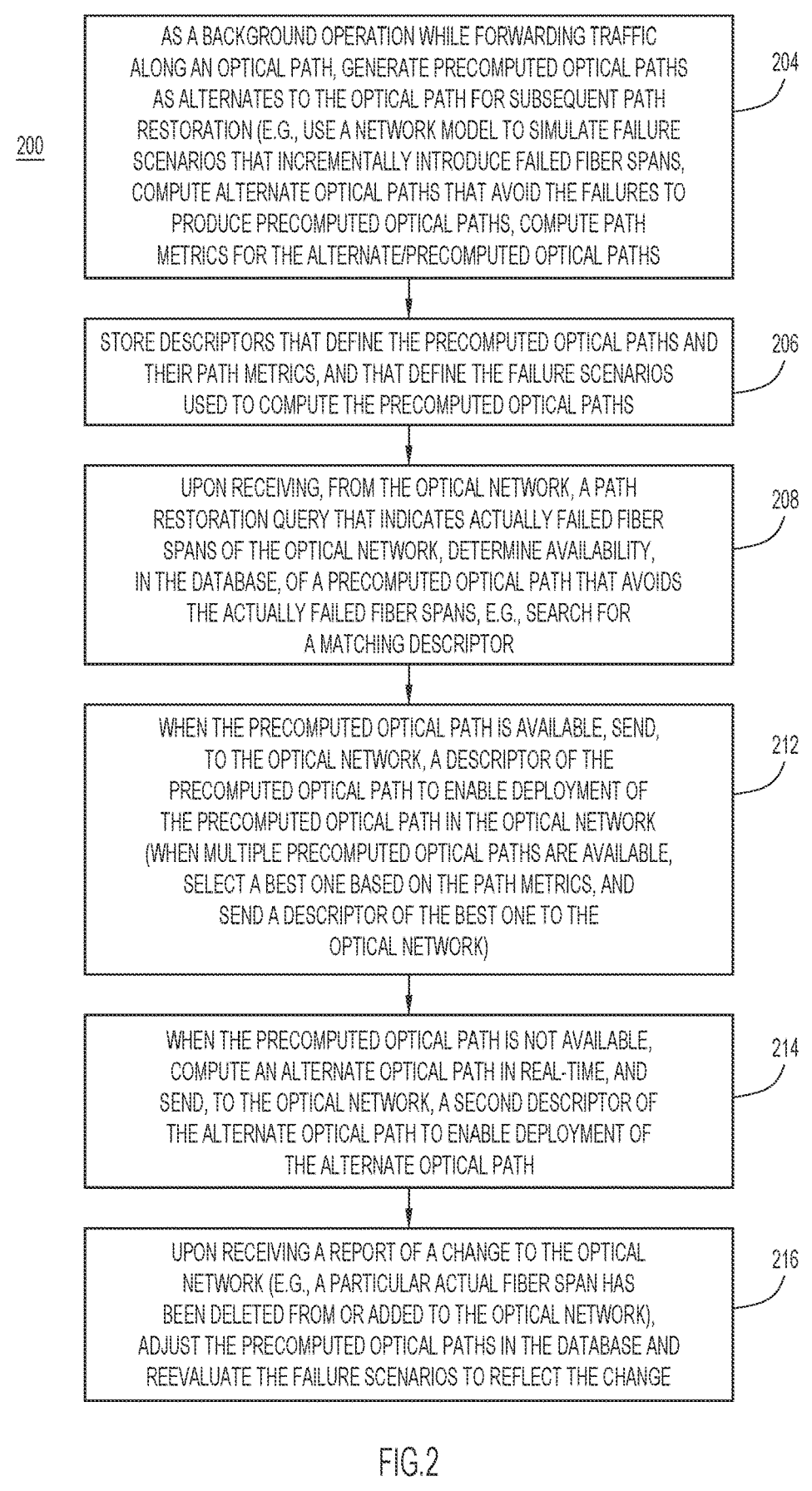

200

AS A BACKGROUND OPERATION WHILE FORWARDING TRAFFIC
ALONG AN OPTICAL PATH, GENERATE PRECOMPUTED OPTICAL PATHS
AS ALTERNATES TO THE OPTICAL PATH FOR SUBSEQUENT PATH
RESTORATION (E.G., USE A NETWORK MODEL TO SIMULATE FAILURE
SCENARIOS THAT INCREMENTALLY INTRODUCE FAILED FIBER SPANS,
COMPUTE ALTERNATE OPTICAL PATHS THAT AVOID THE FAILURES TO
PRODUCE PRECOMPUTED OPTICAL PATHS, COMPUTE PATH
METRICS FOR THE ALTERNATE/PRECOMPUTED OPTICAL PATHS

204

STORE DESCRIPTORS THAT DEFINE THE PRECOMPUTED OPTICAL PATHS AND
THEIR PATH METRICS, AND THAT DEFINE THE FAILURE SCENARIOS
USED TO COMPUTE THE PRECOMPUTED OPTICAL PATHS

206

UPON RECEIVING, FROM THE OPTICAL NETWORK, A PATH
RESTORATION QUERY THAT INDICATES ACTUALLY FAILED FIBER
SPANS OF THE OPTICAL NETWORK, DETERMINE AVAILABILITY,
IN THE DATABASE, OF A PRECOMPUTED OPTICAL PATH THAT AVOIDS
THE ACTUALLY FAILED FIBER SPANS, E.G., SEARCH FOR
A MATCHING DESCRIPTOR

208

WHEN THE PRECOMPUTED OPTICAL PATH IS AVAILABLE, SEND,
TO THE OPTICAL NETWORK, A DESCRIPTOR OF THE
PRECOMPUTED OPTICAL PATH TO ENABLE DEPLOYMENT OF
THE PRECOMPUTED OPTICAL PATH IN THE OPTICAL NETWORK
(WHEN MULTIPLE PRECOMPUTED OPTICAL PATHS ARE AVAILABLE,
SELECT A BEST ONE BASED ON THE PATH METRICS, AND
SEND A DESCRIPTOR OF THE BEST ONE TO THE
OPTICAL NETWORK)

212

WHEN THE PRECOMPUTED OPTICAL PATH IS NOT AVAILABLE,
COMPUTE AN ALTERNATE OPTICAL PATH IN REAL-TIME, AND
SEND, TO THE OPTICAL NETWORK, A SECOND DESCRIPTOR OF
THE ALTERNATE OPTICAL PATH TO ENABLE DEPLOYMENT OF
THE ALTERNATE OPTICAL PATH

214

UPON RECEIVING A REPORT OF A CHANGE TO THE OPTICAL
NETWORK (E.G., A PARTICULAR ACTUAL FIBER SPAN HAS
BEEN DELETED FROM OR ADDED TO THE OPTICAL NETWORK),
ADJUST THE PRECOMPUTED OPTICAL PATHS IN THE DATABASE AND
REEVALUATE THE FAILURE SCENARIOS TO REFLECT THE CHANGE

Figure 3:
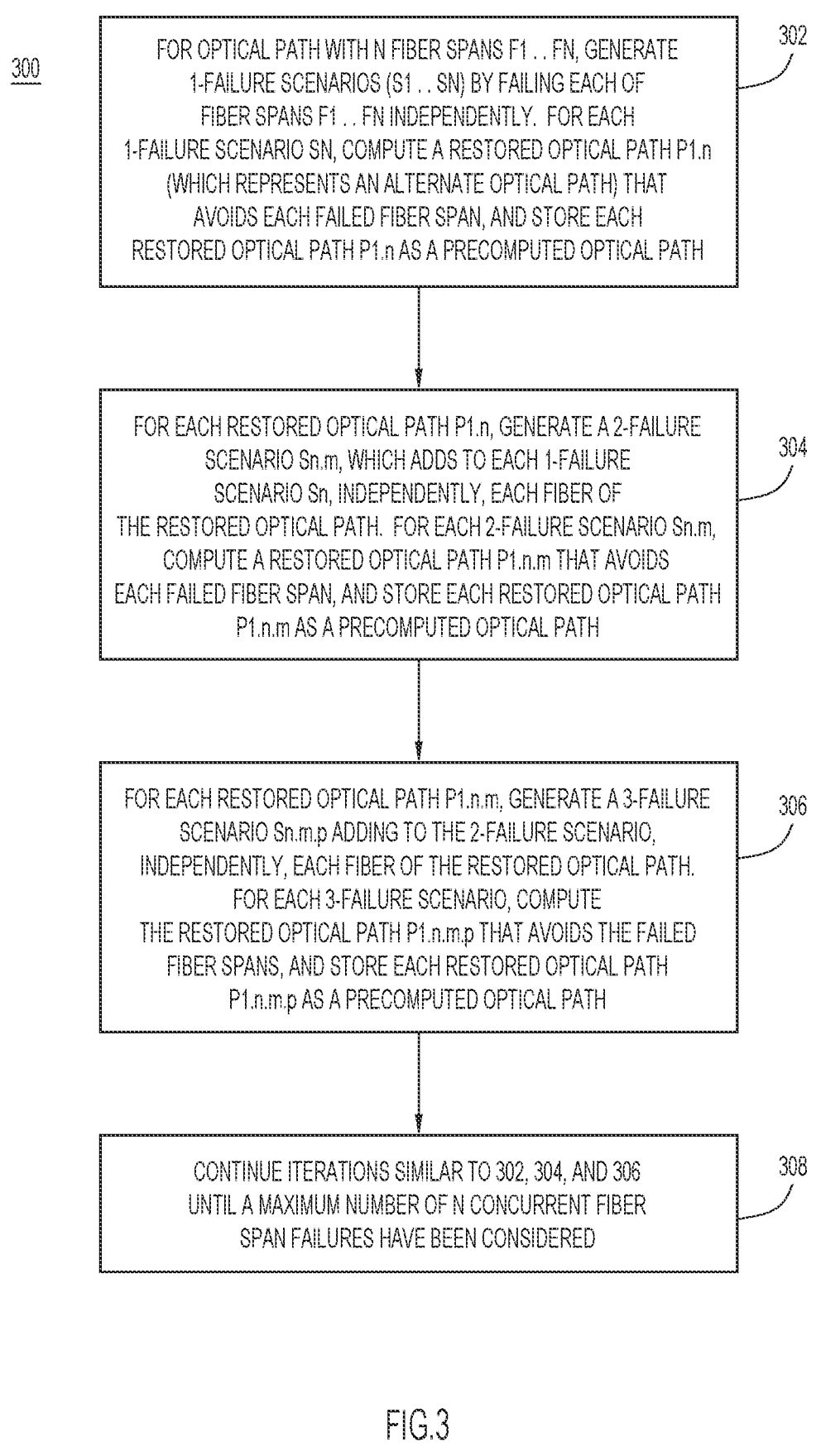

FOR OPTICAL PATH WITH N FIBER SPANS F1 .. FN, GENERATE
1-FAILURE SCENARIOS (S1 .. SN) BY FAILING EACH OF
FIBER SPANS F1 .. FN INDEPENDENTLY. FOR EACH
1-FAILURE SCENARIO SN, COMPUTE A RESTORED OPTICAL PATH P1.n
(WHICH REPRESENTS AN ALTERNATE OPTICAL PATH) THAT
AVOIDS EACH FAILED FIBER SPAN, AND STORE EACH
RESTORED OPTICAL PATH P1.n AS A PRECOMPUTED OPTICAL PATH

302

FOR EACH RESTORED OPTICAL PATH P1.n, GENERATE A 2-FAILURE
SCENARIO Sn.m, WHICH ADDS TO EACH 1-FAILURE
SCENARIO Sn, INDEPENDENTLY, EACH FIBER OF
THE RESTORED OPTICAL PATH. FOR EACH 2-FAILURE SCENARIO Sn.m,
COMPUTE A RESTORED OPTICAL PATH P1.n.m THAT AVOIDS
EACH FAILED FIBER SPAN, AND STORE EACH RESTORED OPTICAL PATH
P1.n.m AS A PRECOMPUTED OPTICAL PATH

304

FOR EACH RESTORED OPTICAL PATH P1.n.m, GENERATE A 3-FAILURE
SCENARIO Sn.m.p ADDING TO THE 2-FAILURE SCENARIO,
INDEPENDENTLY, EACH FIBER OF THE RESTORED OPTICAL PATH.
FOR EACH 3-FAILURE SCENARIO, COMPUTE
THE RESTORED OPTICAL PATH P1.n.m.p THAT AVOIDS THE FAILED
FIBER SPANS, AND STORE EACH RESTORED OPTICAL PATH
P1.n.m.p AS A PRECOMPUTED OPTICAL PATH

306

CONTINUE ITERATIONS SIMILAR TO 302, 304, AND 306
UNTIL A MAXIMUM NUMBER OF N CONCURRENT FIBER
SPAN FAILURES HAVE BEEN CONSIDERED

REFERENCE CIRCUIT OR SERVICE ID — 404

PRECOMPUTED OPTICAL PATH DEFINITION (LIST OF FIBERS SPANS) — 406

FAILURE SCENARIO (LIST OF FAILED FIBERS SPANS) — 408

PATH METRIC — 410

PROACTIVE PATH COMPUTATION ELEMENT TO ACCELERATE PATH COMPUTATION

TECHNICAL FIELD

The present disclosure relates to path computations in an optical network.

BACKGROUND

A path computation element (PCE) performs path computations for an optical network. In a path restoration scenario, a failed optical path is reported to the PCE or an optical network controller (ONC) that employs the PCE. In response, a conventional real-time PCE computes, in real-time, multiple alternate optical paths before one of the alternate optical paths can be applied to restore the failed optical path. In a large, meshed, complex optical network, path computation and validation performed by the conventional real-time PCE in real-time after the failure report is received can take significant time, on the order of many minutes. Moreover, the shortest computed optical path may not provide an applicable solution. For example, often hundreds of alternate optical paths are validated in real-time in order to find a solution (i.e., a restorative optical path) that satisfies all path constraints. Since each path computation/ validation can take hundreds of milliseconds, a single path search can take tens of minutes to be completed due to multiple iterations of the path computation. Such delay may not be acceptable due to tight path restoration time requirements set by telecommunications operators. A complete solution analysis that considers different network layers (e.g., optical, optical transport network (OTN), Internet Protocol (IP), and so on) takes even more time to complete. Possible strategies, such as graph theory approaches, can reduce the number of candidate optical path solutions to be validated, but do not significantly reduce the path computation time.

BRIEF DESCRIPTION OF THE DRAWINGS

FIG. 2 is a flowchart of a method of path restoration using precomputed optical paths performed by an optical network controller of the optical network environment, according to an example embodiment.

FIG. 3 is a flowchart of a method of computing alternate optical paths for an optical path comprising a set of optical fiber spans, according to an example embodiment.

DETAILED DESCRIPTION

Overview

In an embodiment, a method is performed at a controller of optical nodes of an optical network configured with an optical path comprising a series of fiber spans for forwarding traffic from a source to a destination. The method comprises: as a background operation while forwarding the traffic along the optical path, generating precomputed optical paths as alternates to the optical path for path restoration; storing the precomputed optical paths in a database; upon receiving, from the optical network, a path restoration query that indicates actually failed fiber spans of the fiber spans, determining availability, in the database, of a precomputed optical path of the precomputed optical paths that avoids the actually failed fiber spans; and when the precomputed optical path that avoids the actually failed fiber spans is available, sending, to the optical network, a first descriptor of the precomputed optical path to enable a deployment of the precomputed optical path in the optical network.

Example Embodiments

Figure 1:
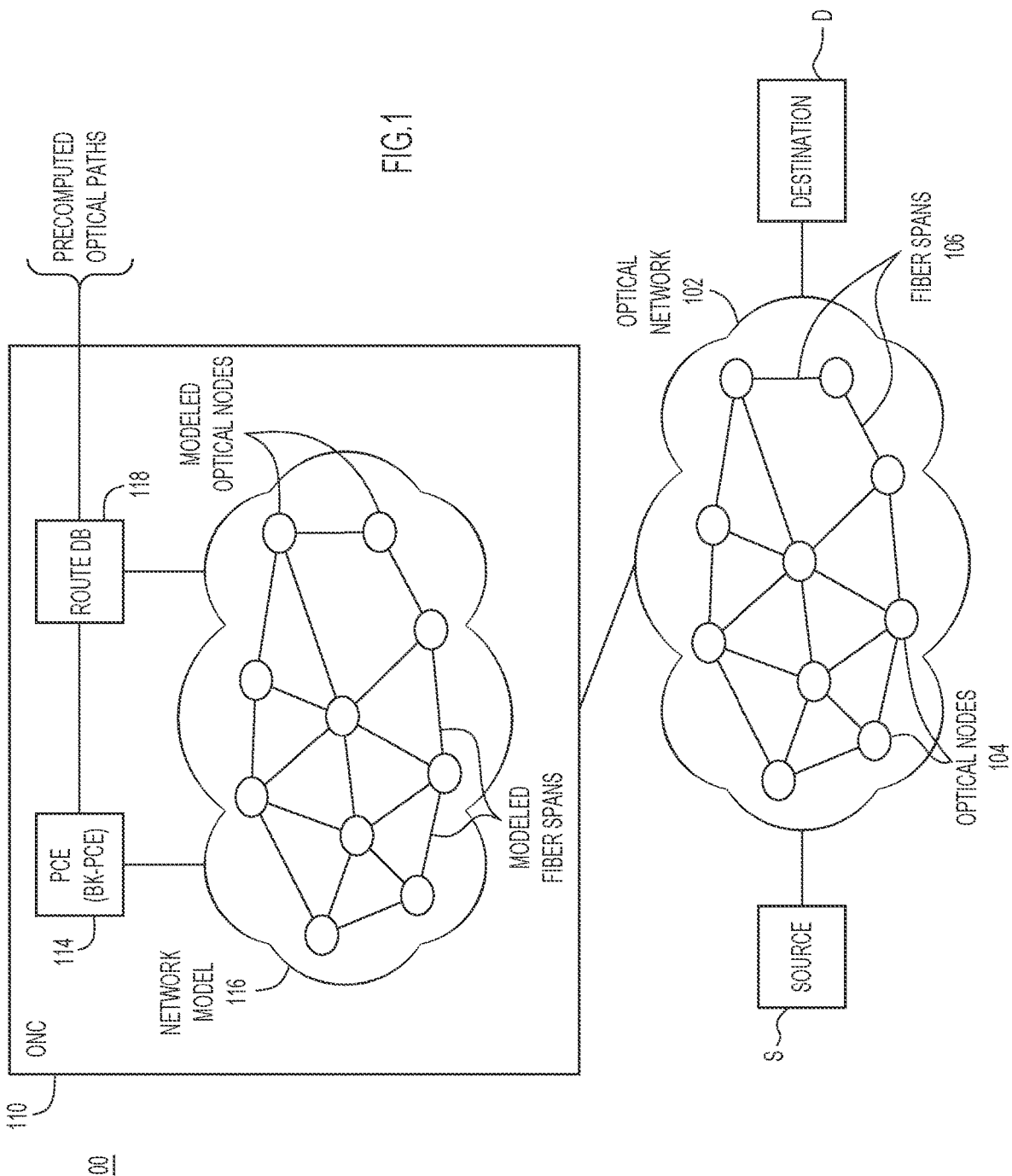
FIG. 1 is a block diagram of an optical network environment in which embodiments directed to efficient path restoration using precomputed optical paths may be implemented, according to an example embodiment.

FIG. 1 is a block diagram of an example optical network environment 100 in which embodiments directed to efficient path restoration using precomputed optical paths may be implemented. Optical network environment 100 includes an optical network 102 comprising optical nodes 104 coupled to one another over fiber spans 106 (also referred to as "optical fiber spans" and "optical links"). Optical nodes 104 include optical devices, such as optical transmitters, receives, repeaters/regenerators, and the like, which provide bidirectional optical communication between each other and users of optical network 102. Optical network environment 100 also includes a source S of network traffic, a destination D to receive the network traffic, and an optical network controller (ONC) 110 each connected to optical network 102. ONC 110 may include a software defined network (SDN) domain controller for optical network 102. ONC 110 includes a path computation element (PCE) 114, a network model 116, and a route database 118 (denoted "RouteDB") described below.

ONC 110 provides overall control of optical network 102. For example, ONC 110 provisions optical network 102, collects information about the inventory and topology of the optical network, monitors the topology (physical or virtual), notifies (and receives notifications) of changes in the topology and service changes, and supports optical path creation and deletion, including a failed optical path restoration service. To this end, ONC 110 employs PCE 114, network model 116, and route database 118. Network model 116 includes modeled or simulated optical nodes and optical fiber spans (referred to simply as "fiber spans") that connect the modeled optical nodes to one another according to a modeled topology that accurately reflects that of optical network 102. PCE 114 employs network model 116 to compute and validate optical paths each based on path parameters, including a source (e.g., a source Internet Protocol (IP) address), a destination (e.g., a destination IP address), path constraints, optical quality, and so on. PCE 114 updates network model 116 to reflect dynamic changes to optical network 102 resulting from actual optical node failures, optical fiber cuts, alarms, and the like. In this way, PCE 114 (and more generally, ONC 110) maintains network model 116 in a current or updated state.

According to embodiments presented herein, PCE 114 executes a path restoration service in the "background," that is, while optical network 102 operates normally to forward traffic from source S to destination D along an optical path deployed in optical network 102 to support one or more services, under control of ONC 110. The optical path may be considered to form part of an optical network "circuit" that serves the one or more services. In the background, PCE 114 employs network model 116 to simulate possible failure scenarios of the optical path actually deployed in optical network 102, and computes and validates alternate (i.e., alternative) optical paths (referred to as "precomputed optical paths") for the services supported by the optical path and that would be disrupted by the failure scenarios if actually present in the optical path. Assuming the optical path includes a series of N fiber spans across optical network 102, the possible failure scenarios may consider/introduce up to N individual (simulated) fiber span failures, and up to N concurrent (simulated) fiber span failures. PCE 114 stores in route database 118 information or descriptors that define the precomputed optical paths along with definitions of the failure scenarios upon which the precomputed optical paths are based, i.e., that were used to compute the precomputed optical paths. The path descriptors may be sorted to permit fast lookups based on the failure scenario, service constraints, and so on. As used herein, the terms "precomputed optical path" and "candidate path" are synonymous and may be used interchangeably.

PCE 114 performs background operations to populate route database 118 with the precomputed optical paths. In this way, PCE 114 operates as a background PCE (BK-PCE). Subsequently, ONC 110 may receive from optical network 102 a path restoration query to restore the optical path for one or more services that use the optical path due to an actual failure along the optical path. In response, ONC 110 searches route database 118 for a precomputed optical path that, when deployed in optical network 102, would avoid the actual failure. When ONC 110 finds the precomputed optical path that would avoid the actual failure, ONC 110 sends to optical network 102 a query response with information, including a definition of the precomputed optical path, to enable the optical network to deploy/implement the precomputed optical path as a restorative path. In this way, the restoration service uses a simple and efficient lookup of the precomputed optical path to avoid computing a new/restorative path in real-time.

As mentioned above, minimizing (or completely avoiding) the time spent evaluating/computing a new/restorative path responsive to a path restoration query can be important during a restoration process, especially when many services or circuits are impacted by a network fault. The embodiments presented herein advantageously provide a quick remedial action to the failed optical path, which greatly reduces the restoration time. Adding further flexibility to the solution, PCE 114 may use any know or hereafter developed algorithms to optimize path computation and selection, and to consider the impact of path selection across different network layers (e.g., optical, OTN, and IP layers).

Comparative tests performed on an optical network reveal that the embodiments presented herein can reduce the time for path restoration from 10-13 seconds associated with computing alternate optical paths in real-time down to a few milliseconds, which is the time taken to perform a quick lookup of precomputed optical paths in route database 118 in lieu of the real-time path computations. During the background operations that compute and validate alternate optical paths, PCE 114 may employ sophisticated algorithms to find a best solution for each service affected by a simulated failure, including a machine learning algorithm, a multilayer algorithm, and so on FIG. 2 is a flowchart of an example method 200 of path restoration using precomputed optical paths performed by ONC 110 (using PCE 114 and route database 118). Method 200 is described with continued reference to FIG. 1. Optical network 102 routes traffic from source S to destination D over an optical path, generally under control of ONC 110.

The optical path includes a set or series of N fiber spans that link together a corresponding series of optical nodes of optical network 102. ONC 110 maintains network model 116, which models optical network 102 and the optical path. In the ensuing description, the term "path" may replace "optical path."

At 204, as a background operation while forwarding the traffic along the optical path, ONC 110 (using the BK-PCE) employs network model 116 to generate precomputed optical paths to serve as possible alternates to the optical path. The background operation may occur before ONC 110 receives a path restoration query for a restorative path to replace the optical path when it fails. ONC 110 may perform the following operations to generate the precomputed optical paths:

a. In the network model, simulate failure scenarios that iteratively and incrementally introduce (simulated) failed fiber spans among the fiber spans. The failed fiber spans as simulated may take account of (simulated) failed optical nodes among the optical nodes.

b. Compute alternate optical paths that avoid (i.e., do not use) the failed fiber spans of the failure scenarios, to produce the precomputed optical paths in correspondence with the failure scenarios. In other words, the precomputed optical paths correspond to respective ones of the failure scenarios. Each precomputed optical path comprises a unique series of fiber spans of the optical network (as modeled) and optical nodes (as modeled) linked together by the fiber spans.

c. Compute individual path metrics (e.g., shortest path metrics) for the precomputed optical paths, e.g., one individual path metric per precomputed optical path. Any form of shortest path metric may be used.

In an example in which the optical path includes N fiber spans, ONC 110 may generate the precomputed optical paths by stepping through the failure scenarios and increasing a number of concurrently failed ones of the fiber spans at each step, starting with one failed fiber span and ending with N concurrently failed ones of the fiber spans. At each step, ONC 110 computes a corresponding one of the precomputed optical paths. In another example, ONC 110 may generate the precomputed optical paths by stepping through the failure scenarios for individually failed ones of the fiber spans at each step, and computing a corresponding one of the precomputed optical paths at each step. An iterative algorithm that may be used to generate the precomputed optical paths is described below in connection with FIG. 3.

Path computations may be performed using any known or hereafter developed optical-PCE path computation algorithm that searches for a shortest path (as defined by a selected path metric) that (i) satisfies a set of constraints (e.g., diversity constraints, disjoint constraints, failed resources avoidance), (ii) has available resources (e.g., spectrum/wavelength), and (iii) is optically feasible, possibly using regenerators when present. Multiple alternate optical paths can be evaluated (K-shortest optical paths). Considering path restoration scenarios, PCE 114 computes for each circuit/service one or more alternate optical paths for each failure scenario affecting the circuit/service. Because computing all possible N-failure scenarios in an optical network is sometimes impractical, the embodiments presented herein may employ an iterative path computation algorithm described below in connection with FIG. 3 to limit a number of failure scenarios considered to only the failure scenarios that actually affect the circuit/service.

At 206, ONC 110 stores in route database 118 descriptors that define the precomputed optical paths and the failed fiber spans that the precomputed optical paths avoid. Each descriptor defines/identifies (i) all fiber spans (as modeled) that implement a corresponding one of the precomputed optical paths, (ii) the failed fiber spans (as modeled) used to compute the precomputed optical path, and (iii) the individual path metric for the corresponding one of the precomputed optical paths. Additionally, ONC 110 may sort or rank the precomputed optical paths according to their individual path metrics, from best path metric to worst, and then store the precomputed optical paths in a ranked order.

At 208, the optical path actually fails due to failures of one or more of the fiber spans (referred to as "actually failed fiber spans") of the optical path. ONC 110 receives, from optical network 102 (or from a service that monitors the health of the optical network), a path restoration query to restore service interrupted by the failed optical path. The query indicates (i.e., includes indications of) the actually failed fiber spans. Upon receiving the path restoration query, ONC 110 determines the availability (in route database 118) of a precomputed optical path (i.e., a particular precomputed optical path) among the precomputed optical paths that avoids the actually failed fiber spans. For example, using the indications of the actually failed fiber spans from the path restoration query, ONC 110 searches route database 118 for a precomputed optical path that avoids the actually failed fibers spans as defined by the descriptors of the precomputed optical paths.

When the precomputed optical path that avoids the actually failed fiber spans is available (e.g., is found) in route database 118, at 212, ONC 110 creates a path restoration query response that includes the descriptor of the precomputed optical path. ONC 110 sends the path restoration query response to optical network 102 to enable the optical network to deploy the precomputed optical path to restore the interrupted service based on the path information provided in the past restoration query response. When multiple precomputed optical paths that avoid the actually failed fiber spans are available (e.g., are found) (i.e., determining the availability returns the multiple precomputed optical paths), ONC 110 selects a top ranked one of the multiple precomputed optical paths based on the path metrics as the precomputed optical path.

Alternatively, when the precomputed optical path that avoids the actually failed fiber spans is not available, at 214, ONC 110 computes an alternate optical path in real-time (i.e., the alternate optical path in this case is not precomputed), and sends, to optical network 102, a descriptor of the alternate optical path to enable the deployment of the alternate optical path in the optical network.

Typically, the network topology and properties of optical network 102 are dynamic and change over time. When the network topology and properties of optical network 102 change, ONC 110 updates the precomputed optical paths stored in route database 118 to reflect the changes. Because rebuilding route database 118 fully may be impractical from a time perspective, ONC 110 may perform incremental updates based on certain change events for optical network 102 that are reported to the ONC by the optical network or an administrator (or are otherwise discovered by the ONC). Such change events include a fiber span/optical node (referred to simply as a "node") delete, a fiber span/node add, and a fiber span optical property change, as described below.

Fiber span/node (i.e., resource) delete. For this change event, ONC 110:
    a. Deletes or invalidates any precomputed optical paths that reference the deleted resource.

b. Reevaluates the failure scenario(s) that references the deleted resource.

Fiber span/node (i.e., resource) add. Adding a fiber span/node does not invalidate existing precomputed optical paths, but better alternate optical paths may be available. For this change event, ONC 110 can discover the better alternate optical paths by periodically reevaluating the failure scenarios. ONC 110 can prioritize the failure scenarios for revaluation by considering (i) failure scenarios with no available optical paths, and (ii) circuits/services that have a shortest optical path using the new resource.

Fiber span optical property change. For this change event, ONC 110 reevaluates the precomputed optical paths that reference the changed fiber span; if the optical path is no longer optically feasible, the ONC reevaluates the referenced failure scenario(s).

According to the change scenarios described above, at 216, ONC 110 receives a report of (or otherwise discovers) a change to optical network 102. Responsive to the report or discovery, ONC 110 updates precomputed optical paths in route database 118 to reflect the change. For example, upon receiving a report that a particular actual fiber span has been deleted from optical network 102, ONC 110 deletes, from route database 118, any precomputed optical paths that reference the particular actual fiber span, and reevaluates any failure scenarios that reference the particular actual fiber span (i.e., computes alternate optical paths that consider the particular actual fiber span as deleted, as modeled in network model 116). In another example, upon receiving a report that a particular actual fiber span has been added to optical network 102, ONC 110 reevaluates the failure scenarios to include the particular actual fiber span, as modeled in network model 116.

FIG. 3 is a flowchart of an example method 300 of computing alternate optical paths (i.e., of performing a path computation algorithm (PCA)) for a circuit/service served by an optical path P1 comprising a set of N fiber spans F1 . . . FN. The alternate optical paths are stored as precomputed optical paths in route database 118 for the circuit/service. As described below, the PCA of method 300 is iterative.

At 302, the PCA generates 1-failure scenarios S1 . . . SN by failing each of fiber spans F1 . . . FN independently. For each 1-failure scenario Sn, the PCA computes a restored optical path P1.n (which represents an alternate optical path) for the circuit/service that avoids each failed fiber span Fn. The PCA stores each alternate optical path in route database 118 as a precomputed optical path.

At 304, for each restored optical path P1.n from 302, the PCA generates a 2-failure scenario Sn.m, which adds to each 1-failure scenario Sn, independently, each fiber span of the restored optical path. For each 2-failure scenario Sn.m, the PCA computes a restored optical path P1.n.m for the circuit/service that avoids each failed fiber span.

At 306, for each restored optical path P1.n.m from 304, the PCA generates a 3-failure scenario Sn.m.p adding to the 2-failure scenario, independently, each fiber span of the restored optical path. For each 3-failure scenario, the PCA computes the restored optical path P1.n.m.p for the circuit/service that avoids the failed fiber spans.

At 308, the PCA iterates similarly to 302, 304, and 306 until a maximum number N of concurrent failures are considered.

The PCA stores into route database 118 the alternate optical path generated at each iteration as a precomputed optical path available for a subsequent path restoration.

The N-failures evaluated by method 300 may not be generic N-failures in optical network 102 (where the probability of having N concurrent failures depends on a size of the network), but rather failures affecting the circuit/service and its restored optical paths (where the probability depends on the size of the optical path). Also, failure scenarios that have the same failed fiber spans but in different orders are considered the same (and thus the restored optical path is evaluated only once). In some embodiments, more than one restored optical path may be evaluated for each failure scenario to provide additional path restoration options when resources (e.g., wavelength) are not available; even when this increases the number of computed optical paths in a combinatorial way.

Figure 4:
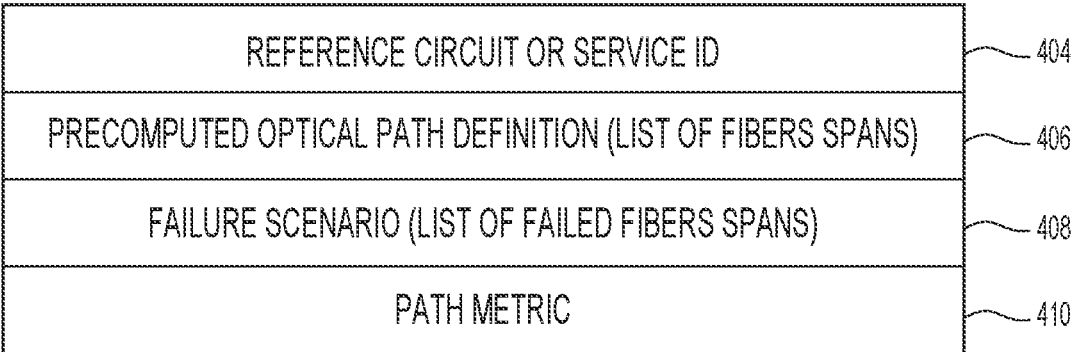
FIG. 4 is an illustration of a descriptor of a precomputed optical path and that is stored in a route database of the optical network environment, according to an example embodiment.

FIG. 4 is an illustration of an example descriptor 402 of a precomputed optical path stored in route database 118. Route database 118 stores multiple such descriptors for corresponding ones of multiple precomputed optical paths. Descriptor 402 includes:

a. Reference circuit/service identifier (ID) 404, which may also include identifiers of a source and a destination, e.g., IP addresses.

b. Precomputed optical path description or definition 406, which includes an ordered list of fiber spans and regeneration points of the precomputed optical path. The fiber spans are identified by fiber span identifiers.

c. Failure scenario description or definition 408, which includes the one or more failed fiber spans considered to compute the precomputed optical path.

d. Path metric 410 computed for the precomputed optical path defined by the descriptor.

The precomputed optical paths stored in route database 118 may each be indexed for fast lookup by, reference circuit/service ID, failed fiber span IDs, and/or path metric.

In addition, the descriptors may be sorted and stored in a rank order based on their path metrics. That is, the descriptors may be sorted according to their path metrics.

Expanding on operations 208 and 212 described above, when the optical path in optical network 102 actually fails due to actually failed fiber spans, optical network 102 sends to ONC 110 the path restoration query to restore the actually failed optical path. The path restoration query includes a circuit/service ID for the actually failed optical path and a list of identifiers of the actually failed fiber spans. Responsive to the query, ONC 110 searches route database 118, using the circuit/service ID and the identifiers of the actually failed fiber spans from the query, for one or more precomputed optical paths having descriptors that match the circuit/service ID of the actually failed optical path and the identifiers of the actually failed fiber spans.

When the search finds a matching precomputed optical path, ONC 110 sends the descriptor for the found/matching precomputed optical path to optical network 102 so that the precomputed optical path can be deployed/implemented as an alternate to the actually failed optical path. When the search finds multiple matching precomputed optical paths in route database 118, ONC 110 selects a found precomputed optical path with a best/highest path metric among the multiple precomputed optical paths. Assuming that the multiple precomputed optical paths are stored in a ranked order, ONC 110 uses the first found precomputed optical path, which saves time.

As an enhancement, alternate optical paths may be computed and used for multiple circuits/services instead of a single circuit. The enhancement defines a circuit profile that contains a set of constraints and characteristics for multiple circuits (e.g., source/destination node, circuit type, route constraints) and associates each circuit to the circuit profile.

Additionally, ONC 110 performs path selection and resource availability checking, as follows. Path computation accounts for the resources allocated by/to the optical path of the circuits active in optical network 102. The actual resource availability in optical network 102 when a restoration action is performed is not known in advance as it depends on the restoration history of other circuits. If an alternate optical path cannot be deployed due to missing resources, ONC 110 considers other alternate optical paths. To this end, route database 118 permits retrieval of multiple precomputed optical paths sorted by the path metric. Moreover, ONC 110 may compute more than one alternate optical path for each failure scenario to provide/produce additional alternate optical path options.

Figure 5:
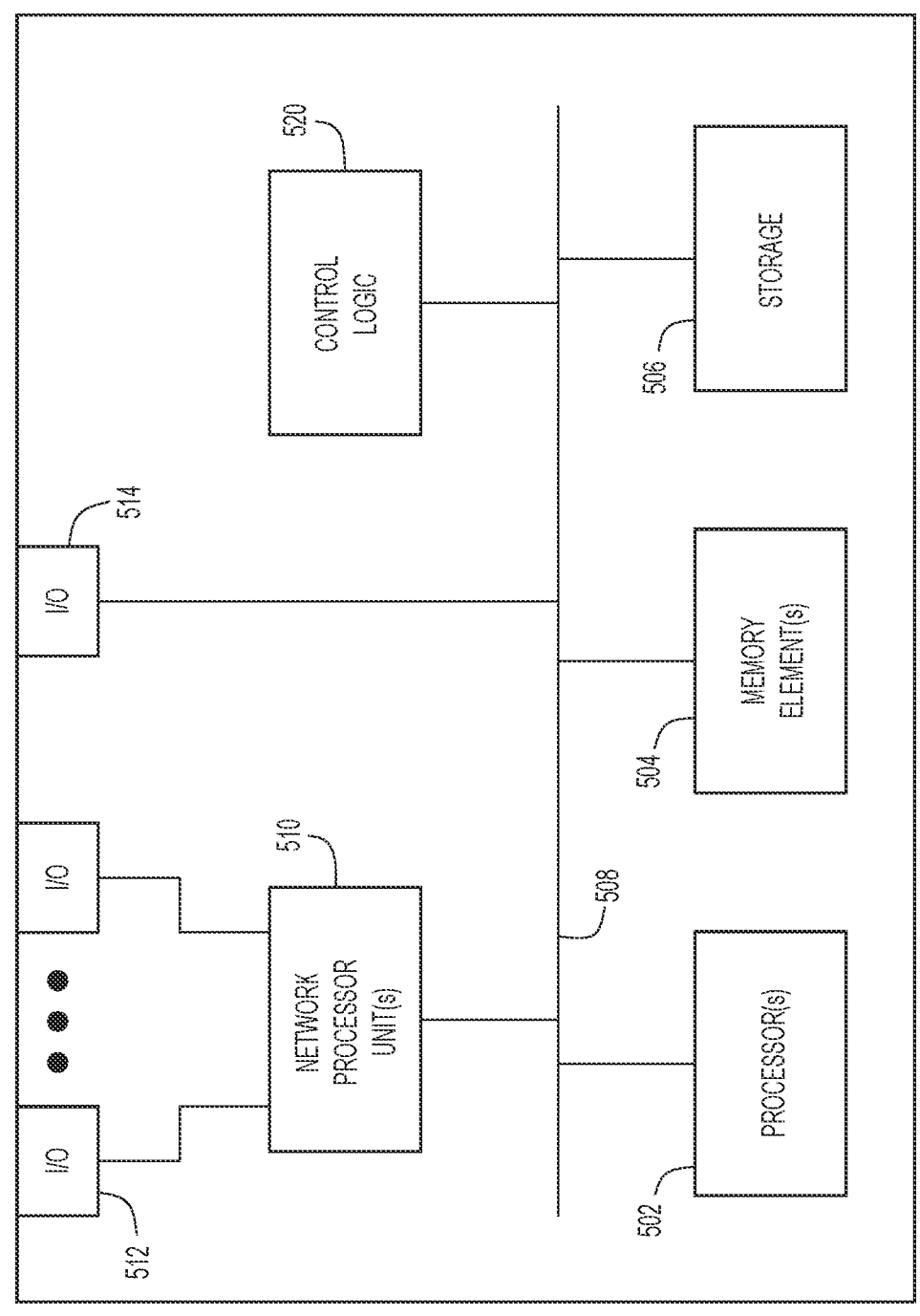
FIG. 5 illustrates a hardware block diagram of a computing device that may perform functions associated with operations discussed herein, according to an example embodiment.

Referring to FIG. 5, FIG. 5 illustrates a hardware block diagram of a computing device 500 that may perform functions associated with operations discussed herein in connection with the techniques depicted in FIGS. 1-4. In various embodiments, a computing device or apparatus, such as computing device 500 or any combination of computing devices 500, may be configured as any entity/entities as discussed for the techniques depicted in connection with FIGS. 1-5 in order to perform operations of the various techniques discussed herein. For example, computing device 500, or various components of the computing device, may represent an ONC and/or any of the optical nodes of an optical network.

In at least one embodiment, the computing device 500 may be any apparatus that may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520. In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with memory element(s) 504 (or vice versa), or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between computing device 500 and other systems, entities, etc., via network I/O interface(s) 512 (wired and/or wireless) to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, any other I/O port(s), and/or antenna(s)/ antenna array(s) now known or hereafter developed. Thus, the network processor unit(s) 510 and/or network I/O interface(s) 512 may include suitable interfaces for receiving, transmitting, and/or otherwise communicating data and/or information in a network environment.

I/O interface(s) 514 allow for input and output of data and/or information with other entities that may be connected to computing device 500. For example, I/O interface(s) 514 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still other instances, external devices can be a mechanism to display data to a user, such as, for example, a computer monitor, a display screen, or the like.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 520) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 504 and/or storage 506 can store data, software, code, instructions (e.g., processor instructions), logic, parameters, combinations thereof, and/or the like used for operations described herein. This includes memory element(s) 504 and/or storage 506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 502.11 (e.g., Wi-Fi®/Wi-Fi6®), IEEE 502.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities (which may be connected to each other directly or indirectly) utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the' (s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

In some aspects, the techniques described herein relate to a method including: at a controller of optical nodes of an optical network configured with an optical path including a series of fiber spans for forwarding traffic from a source to a destination: as a background operation while forwarding the traffic along the optical path, generating precomputed optical paths as alternates to the optical path for path restoration; storing the precomputed optical paths in a database; upon receiving, from the optical network, a path restoration query that indicates actually failed fiber spans of the fiber spans, determining availability, in the database, of a precomputed optical path of the precomputed optical paths that avoids the actually failed fiber spans; and when the precomputed optical path that avoids the actually failed fiber spans is available, sending, to the optical network, a first descriptor of the precomputed optical path to enable a deployment of the precomputed optical path in the optical network.

In some aspects, the techniques described herein relate to a method, further including: when the precomputed optical path that avoids the actually failed fiber spans is not available, computing an alternate optical path in real-time, and sending, to the optical network, a second descriptor of the alternate optical path to enable the deployment of the alternate optical path.

In some aspects, the techniques described herein relate to a method, wherein generating includes: in a model of the optical network, simulating failure scenarios that introduce failed fiber spans among the fiber spans; computing optical paths that avoid the failed fiber spans of the failure scenarios, to produce the precomputed optical paths in correspondence with the failure scenarios; and storing includes storing, in the database, descriptors that define the precomputed optical paths and the failed fiber spans that the precomputed optical paths avoid.

In some aspects, the techniques described herein relate to a method, wherein: the descriptors further include ordered lists of fiber spans of the precomputed optical paths.

In some aspects, the techniques described herein relate to a method, wherein: the path restoration query includes indications of the actually failed fiber spans; and determining the availability includes searching the database for the precomputed optical path that that avoids the actually failed fiber spans based on the descriptors of the precomputed optical paths and the indications of the actually failed fiber spans.

In some aspects, the techniques described herein relate to a method, wherein: the optical path includes N fiber spans; simulating the failure scenarios includes stepping through the failure scenarios and increasing a number of concurrently failed ones of the fiber spans at each step, starting with one failed fiber span and ending with N concurrently failed ones of the fiber spans; and generating includes computing a corresponding one of the precomputed optical paths at each step.

In some aspects, the techniques described herein relate to a method, wherein: simulating the failure scenarios includes stepping through the failure scenarios for individually failed ones of the fiber spans at each step; and generating includes computing a corresponding one of the precomputed optical paths at each step.

In some aspects, the techniques described herein relate to a method, further including: upon receiving a report of a particular actual fiber span that has been deleted from the optical network, deleting, from the database, any precomputed optical paths that reference the particular actual fiber span, and reevaluating any failure scenario that references the particular actual fiber span.

In some aspects, the techniques described herein relate to a method, further including: upon receiving a report of a particular actual fiber span that has been added to the optical network, reevaluating the failure scenarios to include the particular actual fiber span.

In some aspects, the techniques described herein relate to a method, wherein: generating includes computing individual path metrics for the precomputed optical paths; ranking the precomputed optical paths based on the individual path metrics; and when multiple precomputed optical paths among the precomputed optical paths that avoid the actually failed fiber spans are available, selecting a top ranked one of the multiple precomputed optical paths as the precomputed optical path.

In some aspects, the techniques described herein relate to an apparatus including: one or more network processor units to communicate over one or more networks; and a processor of a controller of optical nodes of an optical network configured with an optical path including a series of fiber spans for forwarding traffic from a source to a destination, the processor coupled to the one or more network processor units and configured to perform: as a background operation while forwarding the traffic along the optical path, generating precomputed optical paths as alternates to the optical path for path restoration; storing the precomputed optical paths in a database; upon receiving, from the optical network, a path restoration query that indicates actually failed fiber spans of the fiber spans, determining availability, in the database, of a precomputed optical path of the precomputed optical paths that avoids the actually failed fiber spans; and when the precomputed optical path that avoids the actually failed fiber spans is available, sending, to the optical network, a first descriptor of the precomputed optical path to enable a deployment of the precomputed optical path in the optical network.

In some aspects, the techniques described herein relate to an apparatus, wherein the processor is further configured to perform: when the precomputed optical path that avoids the actually failed fiber spans is not available, computing an alternate optical path in real-time, and sending, to the optical network, a second descriptor of the alternate optical path to enable the deployment of the alternate optical path.

In some aspects, the techniques described herein relate to an apparatus, wherein the processor is configured to perform generating by: in a model of the optical network, simulating failure scenarios that introduce failed fiber spans among the fiber spans; computing optical paths that avoid the failed fiber spans of the failure scenarios, to produce the precomputed optical paths in correspondence with the failure scenarios; and storing includes storing, in the database, descriptors that define the precomputed optical paths and the failed fiber spans that the precomputed optical paths avoid.

In some aspects, the techniques described herein relate to an apparatus, wherein: the descriptors further include ordered lists of fiber spans of the precomputed optical paths.

In some aspects, the techniques described herein relate to an apparatus, wherein: the path restoration query includes indications of the actually failed fiber spans; and the processor is configured to perform determining the availability by searching the database for the precomputed optical path that that avoids the actually failed fiber spans based on the descriptors of the precomputed optical paths and the indications of the actually failed fiber spans.

In some aspects, the techniques described herein relate to an apparatus, wherein: the optical path includes N fiber spans; the processor is configured to perform simulating the failure scenarios by stepping through the failure scenarios and increasing a number of concurrently failed ones of the fiber spans at each step, starting with one failed fiber span and ending with N concurrently failed ones of the fiber spans; and processor is configured to perform generating by computing a corresponding one of the precomputed optical paths at each step.

In some aspects, the techniques described herein relate to a non-transitory computer readable medium encoded with instructions that, when executed by a processor of a controller of optical nodes of an optical network configured with an optical path including a series of fiber spans for forwarding traffic from a source to a destination, cause the processor to perform: as a background operation while forwarding the traffic along the optical path, generating precomputed optical paths as alternates to the optical path for path restoration; storing the precomputed optical paths in a database; upon receiving, from the optical network, a path restoration query that indicates actually failed fiber spans of the fiber spans, determining availability, in the database, of a precomputed optical path of the precomputed optical paths that avoids the actually failed fiber spans; and when the precomputed optical path that avoids the actually failed fiber spans is available, sending, to the optical network, a first descriptor of the precomputed optical path to enable a deployment of the precomputed optical path in the optical network.

In some aspects, the techniques described herein relate to a non-transitory computer readable medium, wherein generating includes: in a model of the optical network, simulating failure scenarios that introduce failed fiber spans among the fiber spans; computing optical paths that avoid the failed fiber spans of the failure scenarios, to produce the precomputed optical paths in correspondence with the failure scenarios; and storing includes storing, in the database, descriptors that define the precomputed optical paths and the failed fiber spans that the precomputed optical paths avoid.

In some aspects, the techniques described herein relate to a non-transitory computer readable medium, wherein: the descriptors further include ordered lists of fiber spans of the precomputed optical paths.

In some aspects, the techniques described herein relate to a non-transitory computer readable medium, wherein: the path restoration query includes indications of the actually failed fiber spans; and determining the availability includes searching the database for the precomputed optical path that that avoids the actually failed fiber spans based on the descriptors of the precomputed optical paths and the indications of the actually failed fiber spans.

The above description is intended by way of example only. Various modifications and structural changes may be made therein without departing from the scope of the concepts described herein and within the scope and range of equivalents of the claims.

What is claimed is:

1. A method comprising:
at a controller of optical nodes of an optical network configured with an optical path comprising a series of fiber spans for forwarding traffic from a source to a destination:
as background operations while forwarding the traffic along the optical path, simulating failure scenarios that introduce failed fiber spans among the fiber spans in a model of the optical network, and computing optical paths to produce precomputed optical paths that avoid the failed fiber spans of the failure scenarios as alternates to the optical path for path restoration;
storing the precomputed optical paths in a database;
upon receiving, from the optical network, a path restoration query that indicates actually failed fiber spans of the fiber spans, determining availability, in the database, of a precomputed optical path of the precomputed optical paths that avoids the actually failed fiber spans; and
when the precomputed optical path that avoids the actually failed fiber spans is available, sending, to the optical network, a first descriptor of the precomputed optical path to enable a deployment of the precomputed optical path in the optical network.

2. The method of claim 1, further comprising:
when the precomputed optical path that avoids the actually failed fiber spans is not available, computing an alternate optical path in real-time, and sending, to the optical network, a second descriptor of the alternate optical path to enable the deployment of the alternate optical path.

3. The method of claim 1, wherein:
computing produces the precomputed optical paths that avoid the failed fiber spans of the failure scenarios in correspondence with the failure scenarios; and
storing includes storing, in the database, descriptors that define the precomputed optical paths and the failed fiber spans that the precomputed optical paths avoid.

4. The method of claim 3, wherein:
the descriptors further include ordered lists of fiber spans of the precomputed optical paths.

5. The method of claim 3, wherein:
the path restoration query includes indications of the actually failed fiber spans; and
determining the availability includes searching the database for the precomputed optical path that avoids the actually failed fiber spans based on the descriptors of the precomputed optical paths and the indications of the actually failed fiber spans.

6. The method of claim 3, wherein:
the optical path includes N fiber spans;
simulating the failure scenarios includes stepping through the failure scenarios and increasing a number of concurrently failed ones of the fiber spans at each step, starting with one failed fiber span and ending with N concurrently failed ones of the fiber spans; and
computing the optical paths includes computing the optical paths to produce a corresponding one of the precomputed optical paths at each step.

7. The method of claim 3, wherein:
simulating the failure scenarios includes stepping through the failure scenarios for individually failed ones of the fiber spans at each step; and
computing the optical paths produces a corresponding one of the precomputed optical paths at each step.

8. The method of claim 3, further comprising:

upon receiving a report of a particular actual fiber span that has been deleted from the optical network, deleting, from the database, any precomputed optical paths that reference the particular actual fiber span, and reevaluating any failure scenario that references the particular actual fiber span.

9. The method of claim 3, further comprising:

upon receiving a report of a particular actual fiber span that has been added to the optical network, reevaluating the failure scenarios to include the particular actual fiber span.

10. The method of claim 1, wherein:

computing includes computing individual path metrics for the precomputed optical paths;

ranking the precomputed optical paths based on the individual path metrics; and when multiple precomputed optical paths among the precomputed optical paths that avoid the actually failed fiber spans are available, selecting a top ranked one of the multiple precomputed optical paths as the precomputed optical path.

11. An apparatus comprising:

one or more network processor units to communicate over one or more networks; and a processor of a controller of optical nodes of an optical network configured with an optical path comprising a series of fiber spans for forwarding traffic from a source to a destination, the processor coupled to the one or more network processor units and configured to perform:

as background operations while forwarding the traffic along the optical path, simulating failure scenarios that introduce failed fiber spans among the fiber spans in a model of the optical network, and computing optical paths to produce precomputed optical paths that avoid the failed fiber spans of the failure scenarios as alternates to the optical path for path restoration;

storing the precomputed optical paths in a database;

upon receiving, from the optical network, a path restoration query that indicates actually failed fiber spans of the fiber spans, determining availability, in the database, of a precomputed optical path of the precomputed optical paths that avoids the actually failed fiber spans; and when the precomputed optical path that avoids the actually failed fiber spans is available, sending, to the optical network, a first descriptor of the precomputed optical path to enable a deployment of the precomputed optical path in the optical network.

12. The apparatus of claim 11, wherein the processor is further configured to perform:

when the precomputed optical path that avoids the actually failed fiber spans is not available, computing an alternate optical path in real-time, and sending, to the optical network, a second descriptor of the alternate optical path to enable the deployment of the alternate optical path.

13. The apparatus of claim 11, wherein the processor is configured to perform:

computing the optical paths to produce the precomputed optical paths that avoid the failed fiber spans of the failure scenarios in correspondence with the failure scenarios; and storing by storing, in the database, descriptors that define the precomputed optical paths and the failed fiber spans that the precomputed optical paths avoid.

14. The apparatus of claim 13, wherein:

the descriptors further include ordered lists of fiber spans of the precomputed optical paths.

15. The apparatus of claim 13, wherein:

the path restoration query includes indications of the actually failed fiber spans; and the processor is configured to perform determining the availability by searching the database for the precomputed optical path that that avoids the actually failed fiber spans based on the descriptors of the precomputed optical paths and the indications of the actually failed fiber spans.

16. The apparatus of claim 13, wherein:

the optical path includes N fiber spans;

the processor is configured to perform simulating the failure scenarios by stepping through the failure scenarios and increasing a number of concurrently failed ones of the fiber spans at each step, starting with one failed fiber span and ending with N concurrently failed ones of the fiber spans; and the background operations further include computing the optical paths to produce a corresponding one of the precomputed optical paths at each step.

17. A non-transitory computer readable medium encoded with instructions that, when executed by a processor of a controller of optical nodes of an optical network configured with an optical path comprising a series of fiber spans for forwarding traffic from a source to a destination, cause the processor to perform:

as background operations while forwarding the traffic along the optical path, simulating failure scenarios that introduce failed fiber spans among the fiber spans in a model of the optical network, and computing optical paths to produce precomputed optical paths that avoid the failed fiber spans of the failure scenarios as alternates to the optical path for path restoration;

storing the precomputed optical paths in a database;

upon receiving, from the optical network, a path restoration query that indicates actually failed fiber spans of the fiber spans, determining availability, in the database, of a precomputed optical path of the precomputed optical paths that avoids the actually failed fiber spans; and when the precomputed optical path that avoids the actually failed fiber spans is available, sending, to the optical network, a first descriptor of the precomputed optical path to enable a deployment of the precomputed optical path in the optical network.

18. The non-transitory computer readable medium of claim 17, wherein:

computing produces the precomputed optical paths that avoid the failed fiber spans of the failure scenarios in correspondence with the failure scenarios; and storing includes storing, in the database, descriptors that define the precomputed optical paths and the failed fiber spans that the precomputed optical paths avoid.

19. The non-transitory computer readable medium of claim 18, wherein:

the descriptors further include ordered lists of fiber spans of the precomputed optical paths.

20. The non-transitory computer readable medium of claim 18, wherein:

the path restoration query includes indications of the actually failed fiber spans; and determining the availability includes searching the database for the precomputed optical path that avoids the actually failed fiber spans based on the descriptors of the precomputed optical paths and the indications of the actually failed fiber spans.

* * * * *